US008511146B2

(12) United States Patent
Brooks

(10) Patent No.: US 8,511,146 B2
(45) Date of Patent: Aug. 20, 2013

(54) PORTABLE APPARATUS FOR DETERMINING LEAKS IN AIR DUCTS

(75) Inventor: Patrick J. Brooks, Columbus, OH (US)

(73) Assignee: United McGill Corporation, Groveport, OH (US)

( * ) Notice: Subject to any disclaimer, the term of this patent is extended or adjusted under 35 U.S.C. 154(b) by 397 days.

(21) Appl. No.: 13/013,244

(22) Filed: Jan. 25, 2011

(65) Prior Publication Data
US 2011/0179854 A1  Jul. 28, 2011

Related U.S. Application Data

(60) Provisional application No. 61/297,933, filed on Jan. 25, 2010.

(51) Int. Cl.
G01M 3/04 (2006.01)
(52) U.S. Cl.
USPC .......................................................... 73/40.7

(58) Field of Classification Search
USPC ........................................ 73/40.7; 137/15.11
See application file for complete search history.

(56) References Cited

U.S. PATENT DOCUMENTS

| | | | | |
|---|---|---|---|---|
| 4,198,856 A | * | 4/1980 | Kaselaan et al. | 73/40.7 |
| 5,335,536 A | * | 8/1994 | Runnevik | 73/40.7 |
| 2003/0110835 A1 | * | 6/2003 | Williams | 73/40.7 |
| 2010/0326171 A1 | * | 12/2010 | Stauffer et al. | 73/40.7 |

* cited by examiner

Primary Examiner — Hezron E Williams
Assistant Examiner — Nathaniel Kolb
(74) Attorney, Agent, or Firm — Jerry K. Mueller, Jr.; Mueller Law, LLC

(57) ABSTRACT

The disclosed portable apparatus for determining leaks in air ducts includes a wheeled cabinet having hand-graspable handles for transport. A front, covered equipment readout includes displays for air duct flow, air duct pressure, blower speed, and smoke generator operation. An on-board variable speed blower control knob also is included on the front panel. Housed within the cart is a variable speed blower, a silencer, a smoke generator, power supply, and multiple venturis of different diameter for different sized air ducts to be tested.

7 Claims, 5 Drawing Sheets

PORTABLE APPARATUS FOR DETERMINING LEAKS IN AIR DUCTS

CROSS-REFERENCE TO RELATED APPLICATIONS

This application claims benefit of provisional application Ser. No. 61/297,933 filed on Jan. 25, 2010, and is cross-referenced to commonly-assigned application Ser. No. 29/354,454 filed on Jan. 25, 2010; the disclosures of which are expressly incorporate herein by reference.

STATEMENT REGARDING FEDERALLY SPONSORED RESEARCH

Not applicable.

BACKGROUND

This disclosure relates to determining the presence of leaks in air ductwork, or simply ducts, and more particularly to a portable, self-contained apparatus therefor.

Air ducts carry conditioned air (one or more of heated, cooled, de-humidified, humidified, etc.) to locations, usually rooms, which require such conditioned air for comfort of people, proper operation of equipment, and the like. Such air ducts often are formed in multiple sections that are joined together for form a "continuous" duct transporting the conditioned air.

It is not unusual for the duct joints to lack sufficient integrity, resulting in leakage of air from the duct. Occasionally, the duct may have a hole in it or other defect that similar permits air to leak from the duct. Regardless of the reason for the air leak, loss of conditioned air may result in the blower or conditioning equipment to remain in a powered condition for longer periods of time, lack of personnel comfort in the room to receive the conditioned air, etc., to occur. Besides the discomfort in the room to receive the conditioned air, waste of power also results.

A variety of air leak detection equipment has been developed and is commercially available. Such equipment often is lacking is being portable and easily transported from job site to job site, lacks flexibility in hooking of to different size air ducts, lacks sufficient capacity to check different size air ducts, and the like. It is to such perceived need in the marketplace that the present disclosure is addressed.

BRIEF SUMMARY

The disclosed portable apparatus for determining leaks in air ducts includes a wheeled cabinet having hand-graspable handles for transport. A front, covered equipment readout includes displays for air duct flow, air duct pressure, blower speed, and smoke generator operation. An on-board variable speed blower control knob also is included on the front panel. Housed within the cart are a variable speed blower, a smoke generator, power supply, and multiple venturis of different diameter for different sized air ducts to be tested.

BRIEF DESCRIPTION OF THE DRAWINGS

For a fuller understanding of the nature and advantages of the present apparatus, reference should be had to the following detailed description taken in connection with the accompanying drawings, in which.

The drawings will be described in greater detail below.

DETAILED DESCRIPTION

Figure 1:
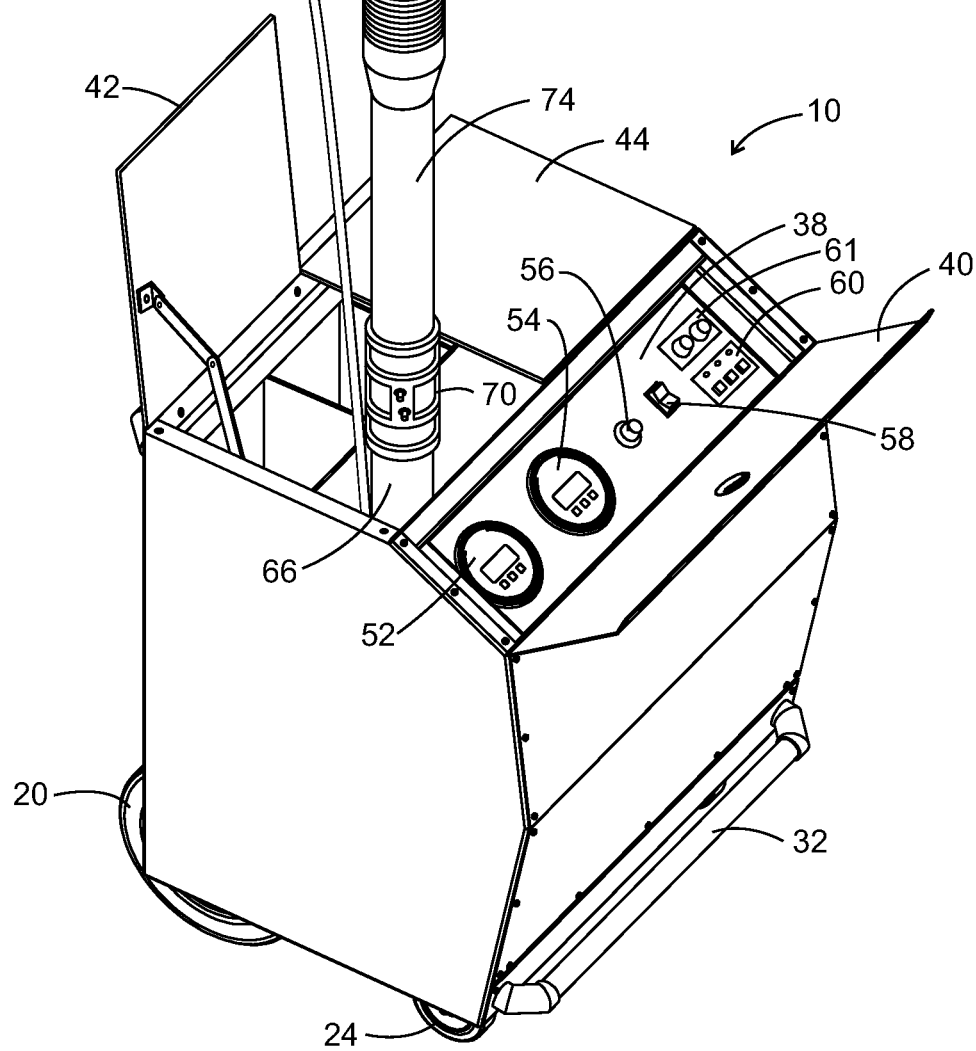
FIG. 1 an isometric view of the disclosed portable apparatus for determining leaks in air ducts hooked up to a duct being tested for air leaks.

Referring initially to FIG. 1, a disclosed portable apparatus for determining leaks in air duct, 10, is shown in an active test mode for testing an air duct, 12. A flexible hose, 14, makes connection between portable apparatus 10 and duct 12. A source of pressurized air can flow from portable apparatus 10 into duct 12 through flexible hose 14. A smaller hose, 16, runs from duct 12 to portable apparatus 10 and measures the static pressure inside duct 12.

Figure 2:
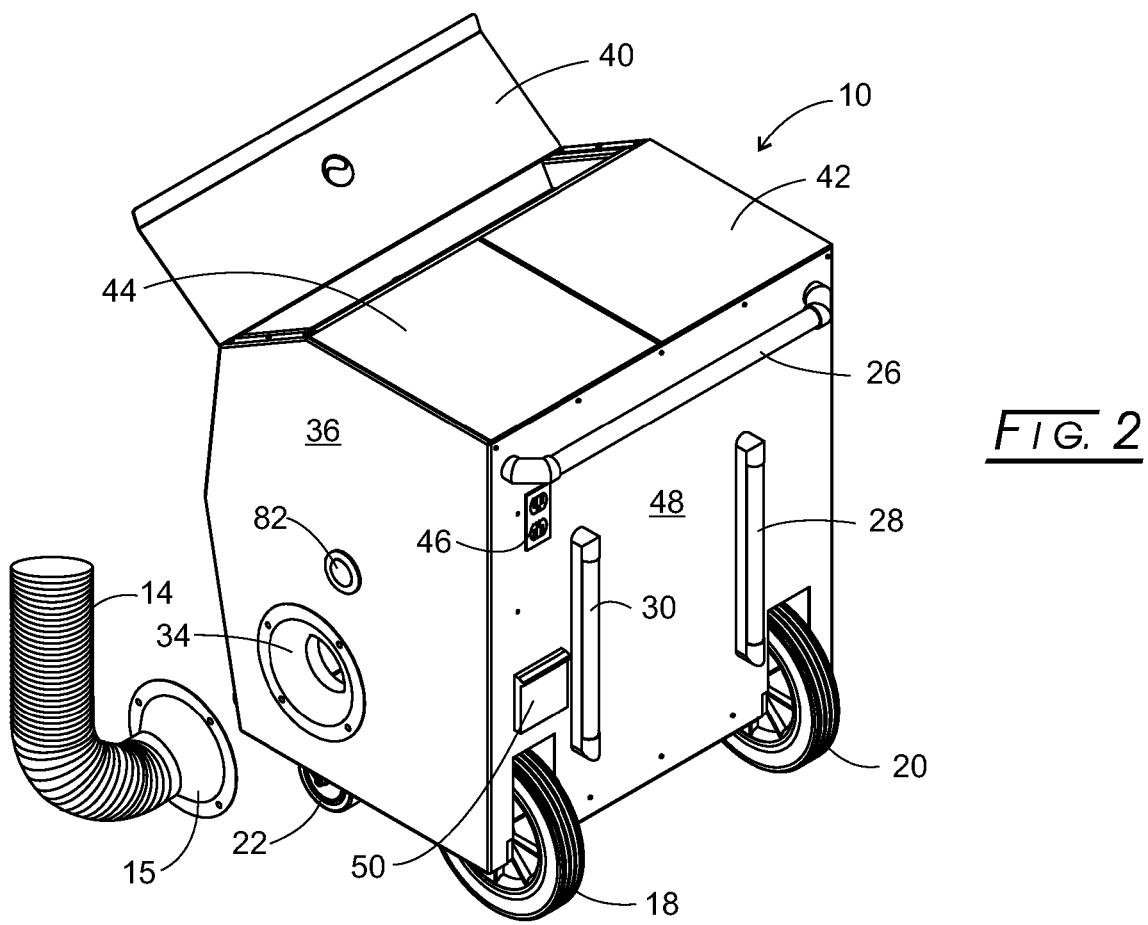
FIG. 2 is an isometric view of the disclosed portable apparatus for determining leaks in air ducts showing its rear and top.

Referring also to FIG. 2, it will be observed that portable apparatus 10 also can be referred to as a portable "cart" and such term often will be used herein by way of illustration and not by way of limitation. Cart 10 has a pair of larger, rear wheels, 18 and 20, and a pair of smaller, caster wheels, 22 and 24. The rear of cart 10 has an upper, hand-graspable bar, 26, for moving cart 10 in any direction. A pair of rear skids, 28 and 30, permit cart 10 to be laid back and pushed/pulled up/down stairs. A lower, front, hand-graspable handle, 32, can be used to lift cart 10 up into the bed of a truck, onto a loading dock, or other surface located above the then location of cart 10.

Figure 3:
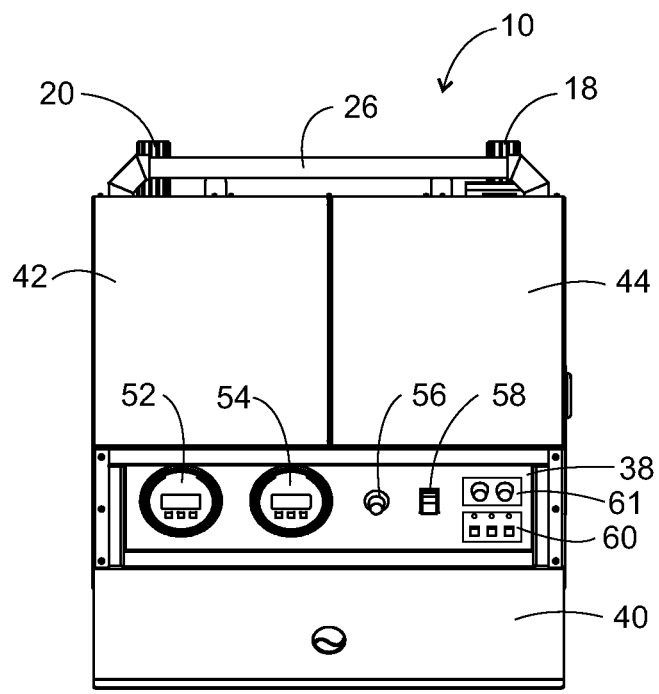
FIG. 3 is a top view of the disclosed portable apparatus for determining leaks in air ducts with the instrument panel cover open.

An air intake, 34, to a blower (to be described later) is seen disposed in a lower sidewall, 36, in FIG. 2. An instrument panel, 38, is revealed when a door, 40, is opened, as illustrated in FIGS. 1-3. The interior volume within cart 10 is accessed by a pair of top doors, 42 and 44, which can be opened/closed separately of each other.

An electric outlet, 46, is disposed on the rear wall, 48, also. Power to cart 10 is supplied by a power cord (not shown), accessible by opening a door, 50, disposed in rear wall 48. The power cord can be plugged into a standard ac electrical outlet. The resulting power can be accessed by other electrical equipment located on cart 10 via electrical outlet 46.

Instrument panel 38 has visible readouts for duct static pressure, 52, and volumetric airflow, 54. A rotatable knob, 56, controls the variable speed blower housed within cart 10. An on/off switch with power status light, 58, turns power on/off to the various electrical equipment housed within cart 10 and a smoke generator on/off switch with power status light, 60, are disposed on instrument panel 38. Finally, smoke generator instrument controls, 61, are on the right side of instrument panel 38 that control the interval and duration of smoke generation.

Figure 6:
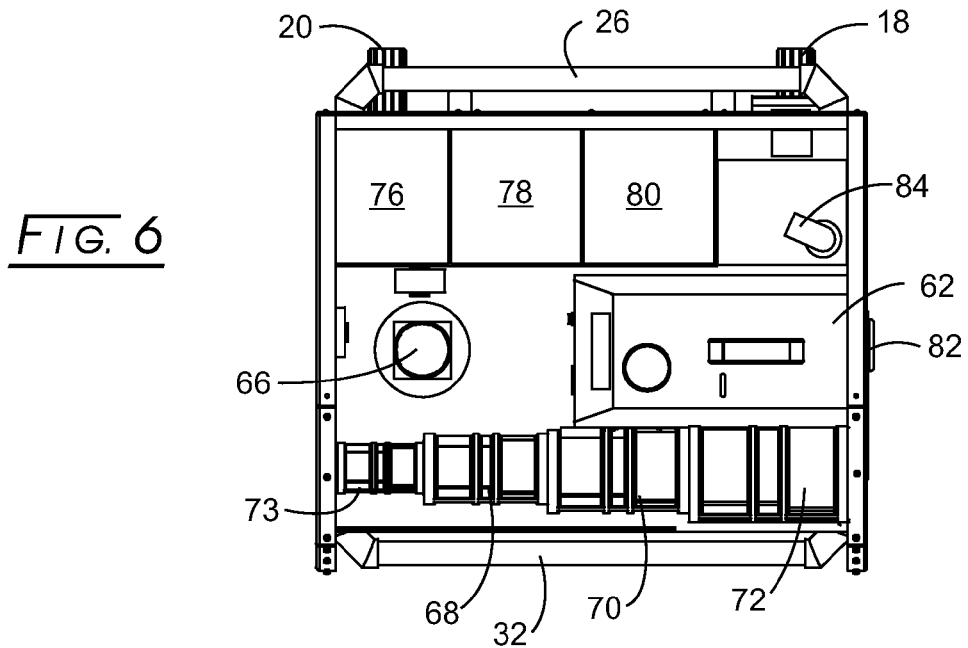
FIG. 6 is a top view showing the inside of the disclosed portable apparatus for determining leaks in air ducts.
Figure 7:
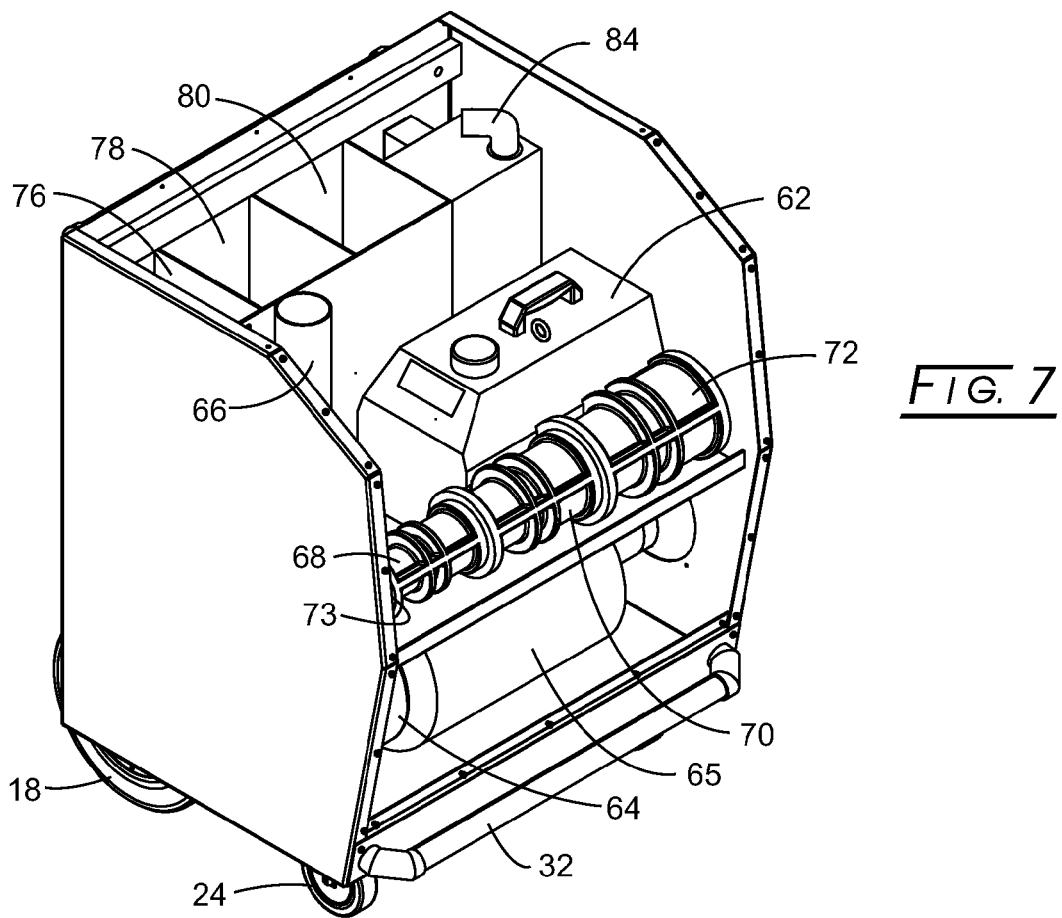
FIG. 7 is an isometric view of the disclosed portable apparatus for determining leaks in air ducts with the front and top removed to display the inside of the apparatus.
Figure 8:
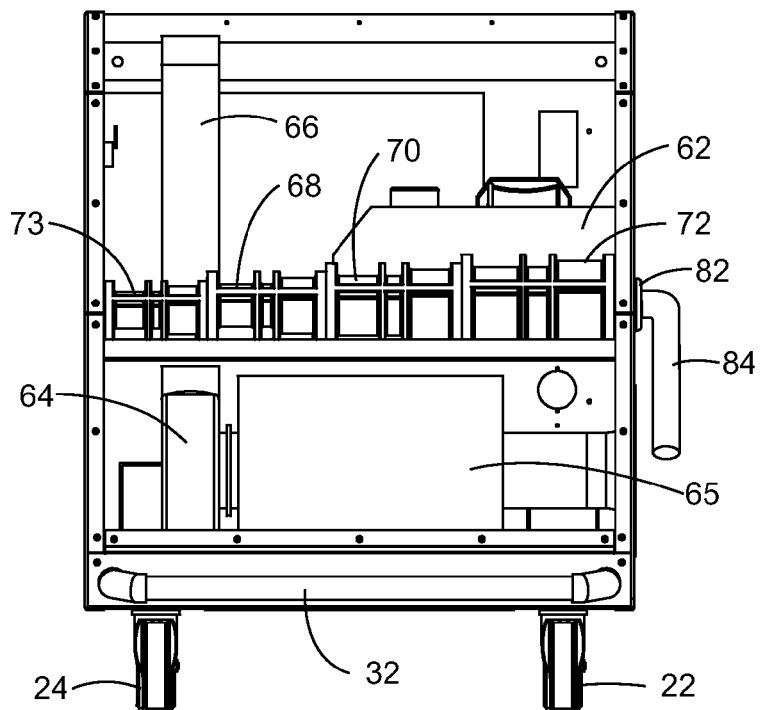
FIG. 8 is a front view of the disclosed portable apparatus for determining leaks in air ducts with the front and top removed to display the inside of the apparatus.
Figure 9:
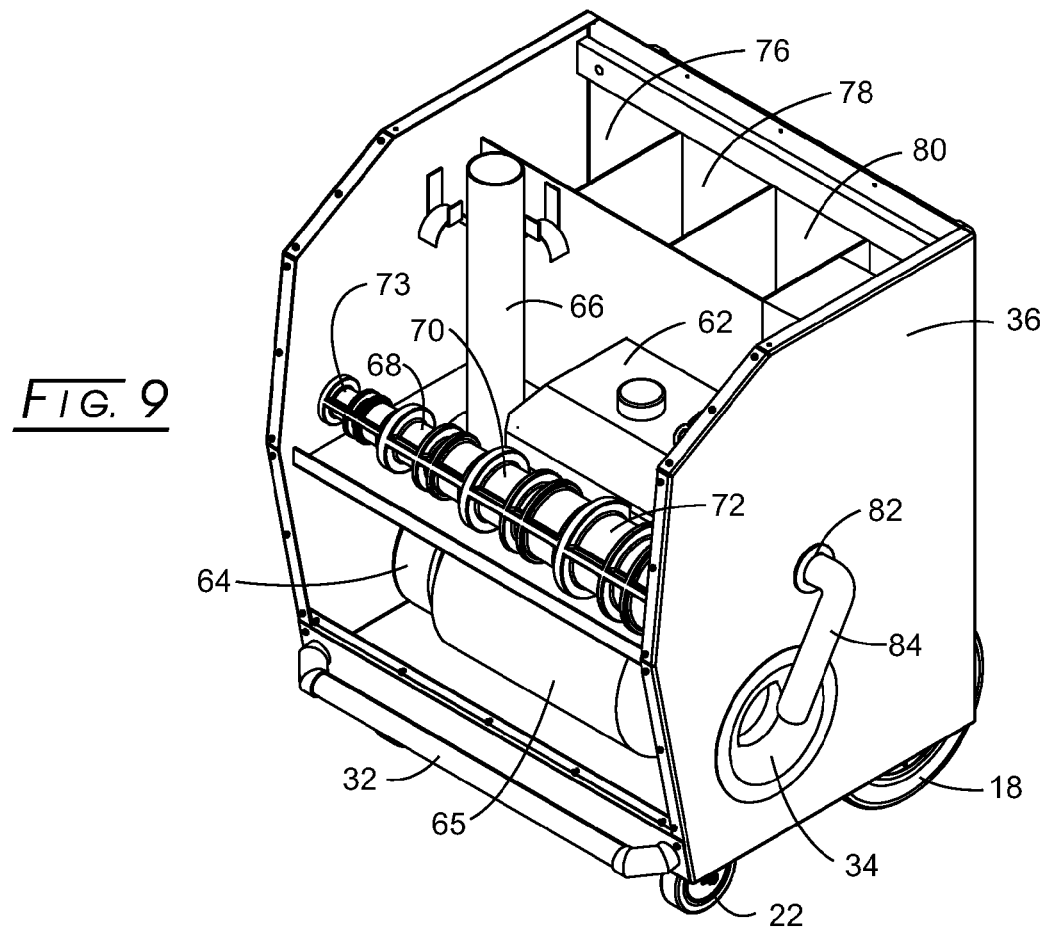
FIG. 9 is an isometric view like that in FIG. 7, but from a perspective of the opposite side from that in FIG. 7.

Referring now to FIGS. 6-9, the interior volume of cart 10 is revealed along with the on-board equipment used to test for air leaks in air duct. Initially, a smoke generator, 62, and a variable speed blower, 64, are revealed. Blower 64 is in flow relationship with a standpipe, 66. A series of different diameter venturi pipes, 68, 70, 72, and 73, (see FIG. 6) are stored above blower 64. Such venturi pipes connect to standpipe 66 and coordinate with different leakage measurement ranges. Connectors, such as a connector, 74 (see FIG. 1) can be used to connect the different sized venturi pipes to flexible hose 14. Such connectors can be stored in compartments, such as compartments, 76, 78, and 80, as seen in FIGS. 6, 7, and 9. Flexible hose 14 can be stored in such compartments also.

Figure 4:
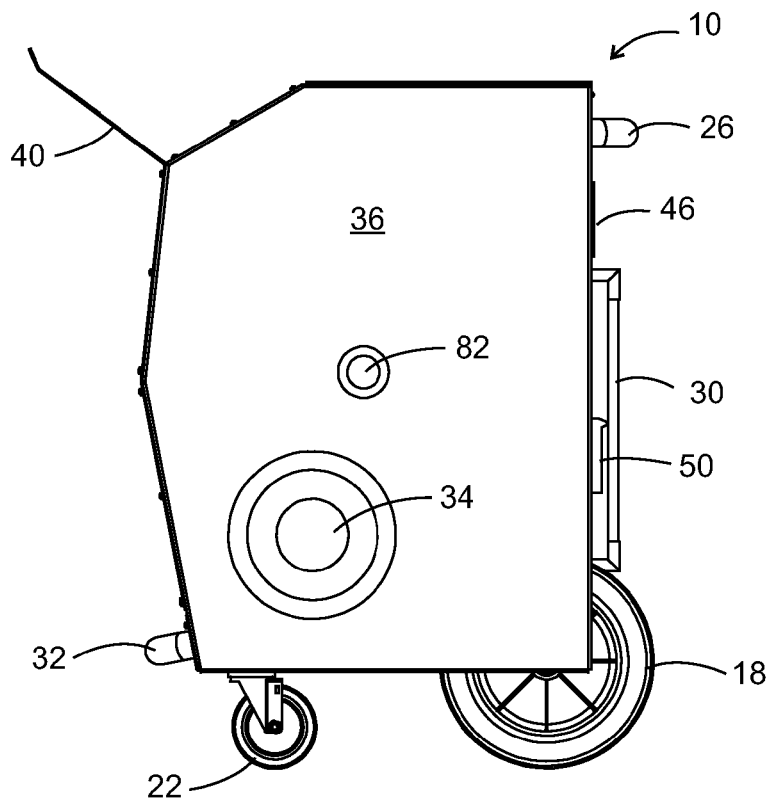
FIG. 4 is side view of one side of the disclosed portable apparatus for determining leaks in air ducts.
Figure 5:
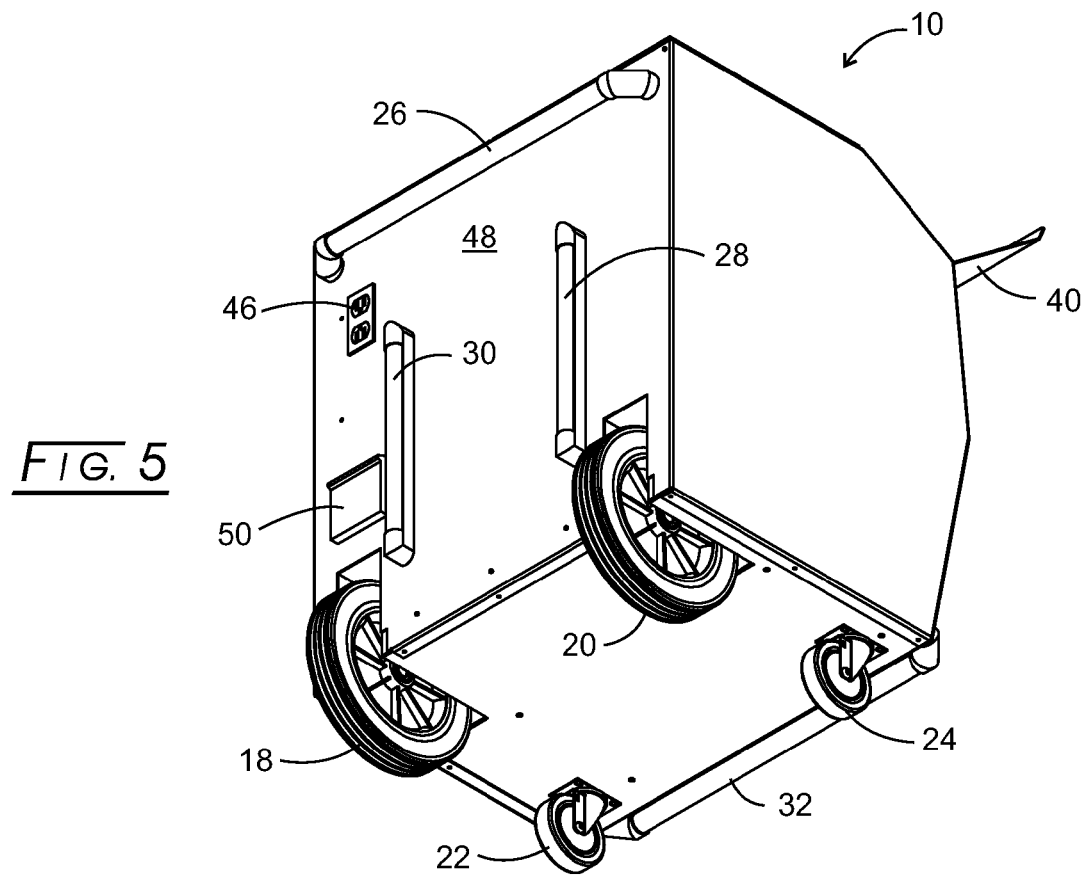
FIG. 5 is an isometric view of the disclosed portable apparatus for determining leaks in air ducts showing the rear and bottom thereof.

Carried within each venturi pipe is a volumetric flow sensor connectable to readout 54. A silencer, 65, is connected to blower 64 for quieting the blower when in operation. Smoke generated by smoke generator 62 exits a port, 82, through a diverter tube, 84, (see FIGS. 2, 4 and 9) and is sucked into intake 34 where blower 64 blows such smoke into duct 12 so that the location of an air leak can be seen.

While the apparatus has been described with reference to various embodiments, those skilled in the art will understand that various changes may be made and equivalents may be substituted for elements thereof without departing from the scope and essence of the disclosure. In addition, many modifications may be made to adapt a particular situation or material to the teachings of the disclosure without departing from the essential scope thereof. Therefore, it is intended that the disclosure not be limited to the particular embodiments disclosed, but that the disclosure will include all embodiments falling within the scope of the appended claims. In this application all units are in the IP (inch-pound) system and all amounts and percentages are by weight, unless otherwise expressly indicated. Readouts of leakage are in standard cubic feet per minute (SCFM). Also, all citations referred herein are expressly incorporated herein by reference.

I claim:

1. A portable apparatus for determining leaks in air ducts, which comprises:

(a) a wheeled cabinet having an interior, said cabinet having a door for accessing said cabinet interior;
(b) a variable speed blower located within said cabinet interior;
(c) a smoke generator located within said cabinet interior;
(d) flexible hose having two ends and located within said cabinet interior, one end, one flexible hose end adapted to mate in air flow relationship with an air duct to be determined;
(e) multiple venturis having two ends, being of different diameter, and located within said cabinet interior, one end of each venturi adapted to mate with a free end of said flexible hose and the other end adapted to be in air flow relationship with said variable speed blower; and
(f) a readout and control panel readable by a user of said portable apparatus,
when using said portable apparatus to determine leaks within air ducts, said smoke generator generating smoke that is blown by said variable speed blower through one of said venturis and into said flexible hose and then into said air duct to be determined.

2. The portable apparatus of claim 1, wherein a standpipe is disposed between said flexible hose and said variable speed blower when using said portable apparatus to determine leaks within air ducts.

3. The portable apparatus of claim 1, wherein a hand-graspable handle is located on the outside of said cabinet for moving said portable apparatus.

4. The portable apparatus of claim 1, which additional carriers a hose connectable between said air duct to be determined and said readout and control panel to determine the negative pressure within said air duct.

5. The portable apparatus of claim 1, wherein one or more compartments are located within said cabinet interior for storing said venturis and said flexible hose.

6. The portable apparatus of claim 1, additionally comprising a pair of rear wheels and a pair of forward caster wheels carried by said cabinet.

7. The portable apparatus of claim 6, additionally comprising a second hand-graspable bar located adjacent to said forward caster wheels.

* * * * *